United States Patent
Peters

[11] 3,782,750
[45] Jan. 1, 1974

[54] BATTERY TRUCK

[76] Inventor: Dudley C. Peters, 6550 Vicksburg Way, Stockton, Calif. 95207

[22] Filed: Sept. 27, 1972

[21] Appl. No.: 292,560

[52] U.S. Cl. ............................. 280/43.17, 104/34
[51] Int. Cl. ............................................. B62d 33/8
[58] Field of Search ............... 280/43, 43.22, 43.17, 280/43.24; 104/34

[56] References Cited
UNITED STATES PATENTS

| | | | |
|---|---|---|---|
| 1,566,089 | 12/1925 | Harding | 104/34 |
| 1,539,119 | 5/1925 | Johnson | 104/34 |
| 2,878,029 | 3/1959 | Dahmen et al. | 280/43.17 |
| 3,041,081 | 6/1962 | Lott | 280/43.17 |
| 2,374,982 | 5/1945 | Davies | 280/43.24 |
| 155,946 | 10/1874 | Hetfield | 280/43.22 |
| 79,571 | 7/1868 | Hewitt et al. | 280/43.22 |
| 2,563,919 | 8/1951 | Christensen | 280/43.17 |

Primary Examiner—Kenneth H. Betts
Assistant Examiner—Jack D. Rubenstein
Attorney—Robert G. West et al.

[57] ABSTRACT

A sturdy box capable of supporting a heavy industrial battery, weighing several hundred pounds, carries on each lateral side an elongated fore and aft housing defining a channel within which is vertically movable an elongated fore and aft carriage. The carriage includes a plurality of rollers engageable with a supporting surface. The rollers are capable of lifting the box by reactive force when the carriage is urged downwardly by a pair of eccentric cams journaled in the housing and engaging the top of the carriage. A hand operated lever actuates the cams and a pawl and ratchet tooth selectively locks the lowered carriage in box-supporting position so that the battery can be moved to the desired location. The battery box is immobilized as the carriage is retracted upwardly and the bottom of the box engages the supporting surface.

3 Claims, 4 Drawing Figures

BATTERY TRUCK

The invention relates to improvements in wheeled devices for selectively moving and immobilizing a container holding a heavy mass, such as a battery carrier, or a tramcar for hauling ore in a mine.

The market place as well as the patent literature affords examples of articles which are selectively raised from the floor by the reactive force exerted by wheels which are urged downwardly by lever operated cams, exemplary being Hewitt et al. U.S. Pat. No. 79,571 dated July 7, 1868 for Furniture Caster, and Dahmen et al. U.S. Pat. No. 2,878,029 dated March 17, 1959 for Shipping and Piling Container with Runner Rollers and Supporting Means.

So far as is known, however, neither the prior art nor the market place has afforded a truck capable of safely supporting and maneuvering from place to place batteries weighing many hundreds of pounds.

It is therefore an object of the invention to provide a battery truck which lends itself particularly well for use in handling industrial batteries.

It is another object of the invention to provide a battery truck which is compact in size and low in profile so that it can be installed in small compartments.

It is still another object of the invention to provide a battery truck which is relatively economical, both as to acquisition and upkeep costs, yet is safe, efficient and reliable in operation.

It is a further object of the invention to provide a battery truck which is rugged, long-lived and easily serviced.

It is yet a further object of the invention to provide a battery truck which is easily maneuvered yet is securely immobilized when lowered into stationary position.

It is still a further object of the invention to provide a hand truck which can easily be operated by hand, yet can readily be converted to power handling, if desired.

It is an additional object of the invention to provide an improved battery truck.

Other objects, together with the foregoing, are attained in the embodiment described in the following description and illustrated in the accompanying drawings, in which.

Figure 1:
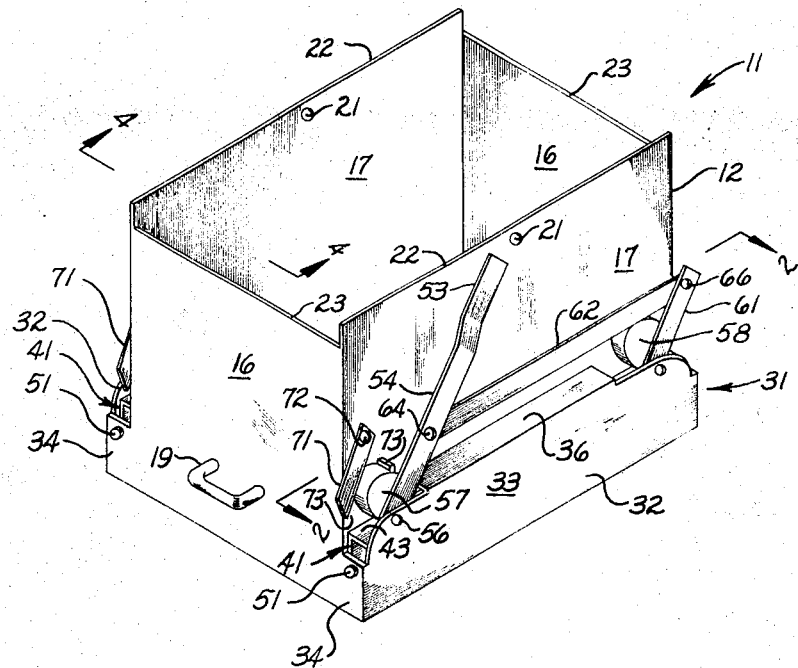
FIG. 1 is a perspective view of the truck in lowered, or stationary, position, the battery being removed to reveal portions of the inside walls of the box.
Figure 3:
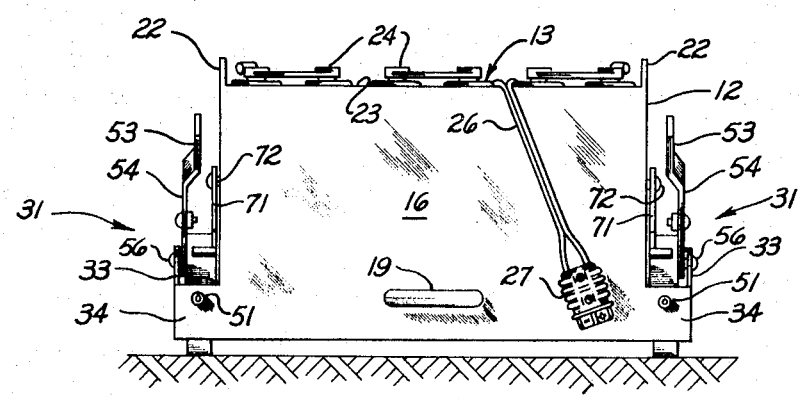
Figure 4:
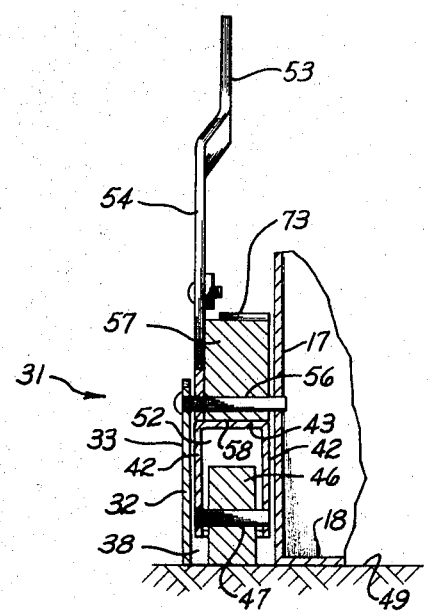

FIG. 3 is an end elevational view of the left-hand end of the truck shown in FIG. 1, but with the box containing a battery and being in elevated position to allow the truck to be maneuvered; and, FIG. 4 is a fragmentary, transverse, sectional view, to an enlarged scale, showing the carriage in retracted position, thereby immobilizing the battery truck, the plane of the section being indicated by the line 4 — 4 in FIG. 1.

While the battery truck of the invention is susceptible of numerous physical embodiments, depending upon the environment and requirements of use, substantial numbers of the herein shown and described embodiment have been made, tested and used, and all have performed in an eminently satisfactory manner.

One typical environment in which the truck has operated to great advantage is that of a railway caboose wherein batteries are used as an energy source for various caboose requirements, such as air conditioning. Many caboose batteries are of the 16 cell, 32-volt type, often weighing in excess of 800 pounds. The battery is customarily installed in a small compartment built in the caboose; and although the battery must remain firmly fixed in position while in use, it must also be readily maneuverable when inspection, service, repair or replacement becomes necessary.

The required maneuverability as well as strength and stability are fully attained in the battery truck of the invention, generally designated by the reference numeral 11, comprising a strong metal box 12 having the necessary size and shape to accommodate an industrial battery 13. The box 12 includes a pair of end walls 16, fore and aft side walls 17 and a bottom 18. A pair of hand grips 19 is mounted on the end walls 16 for convenience in moving the truck, and a pair of registering openings 21 on the central upper portion of the side walls 17 is capable of receiving the hooks of a lifting sling.

The upper margins 22 of the side walls 17 extend somewhat above and thereby help protect the upstanding cell terminals and connectors 24 of the battery (see FIG. 3), from which depends the customary conductor 26 and attendant receptacle 27.

The battery truck 11 is bilaterally symmetrical about a median, vertical, fore and aft plane. Consequently, a description of the box lifting mechanism 31 on one lateral side of the truck will serve equally to describe the other.

Mounted on the outer side of the side wall 17, and adjacent the lower portion thereof, is an elongated, fore and aft housing structure 32 comprising an elongated, fore and aft side plate 33, parallel to the adjacent side wall 17, a pair of end plates 34 comprising transverse elongations of the lower portions of the end plates 16, and a top plate 36 spanning the distance between the box side wall 17 and the housing side plate 33.

The side wall 17 and the parallel side plate 33 spaced therefrom defines a vertical, fore and aft channel 38 within which is vertically movable an elongated fore and aft carriage 41.

The carriage 41 comprises an elongated, open-ended hollow beam 40 of rectangular cross-section including a pair of side panels 42, a top panel 43 and a bottom panel 44. Journaled in the side panels 42 is a plurality of rollers 46, or wheels, carried on axles 47. The rollers 46 protrude downwardly through wells 48 in the bottom panel 44 and in downwardly projected position of the carriage, the rollers are in engagement with a supporting surface 49, such as a floor.

A pair of intrusive machine screws 51 extending through the opposite end plates 34 into the hollow interior chamber 52 in the carriage underlies the adjacent end portions of the top panel 43 and serves as a limit stop preventing the carriage 41 from falling out of the housing channel 38 when the entire truck is lifted off the supporting surface.

During the period of battery use, the truck is ordinarily located in a closely encompassing battery compartment, and the truck must be immobile so that when the caboose lurches or is buffeted, as during car coupling, the heavy battery remains fixed in position.

With the carriage 41 in the upper, or retracted, position, shown in FIGS. 1 and 4, the rollers 46 merely rest on the supporting surface 49, supporting only the weight of the superposed carriage beam 40. The entire weight of the battery, the box and the housings is imposed directly on the supporting surface 49 (see FIG. 4) through the box bottom 18. Although not ordinarily necessary, the lower surface of the box bottom 18 can be roughened, as by strips of stair tread tape, to increase the coefficient of friction.

Figure 2:
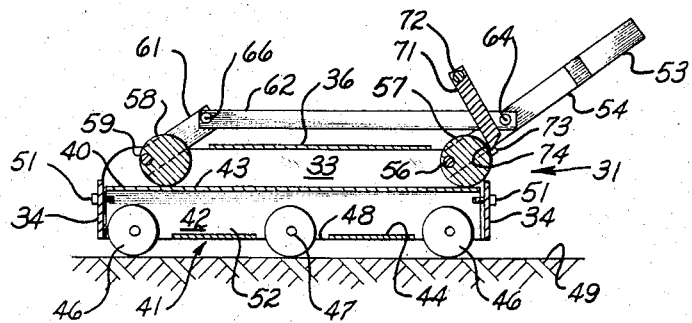
FIG. 2 is a longitudinal, sectional view, the plane of the section being indicated by the line 2 — 2 in FIG. 1, but showing the eccentric cams in the opposite position to that appearing in FIG. 1, and with the carriage projected downwardly into box-elevating position.

In order to project the carriage 41 downwardly and thereby elevate the battery box by reactive force, into the positions shown in FIGS. 2 and 3, the operator grasps the handles 53 of operating levers 54 and pulls them from the inwardly inclined attitude shown in FIGS. 1 and 4 to the outwardly inclined position illustrated in FIGS. 2 and 3.

The lower end of the operating lever 54 is pivotally mounted on a pin 56, spanning the housing side plate 33 and adjacent side wall 17. The lever is also suitably secured to an eccentric cam 57 so dimensioned and positioned that when the lever 54 is in base (box immobilized) attitude (as in FIGS. 1 and 4) the distance between the pivot pin 56 and the arcuate surface 58 in engagement with the top panel 43 of the carriage is sufficiently small in extent so that the cam 57 exerts no significant downward force on the carriage 41. However, when the lever 54 is pulled into its outer, operative position, as in FIGS. 2 and 3, the eccentric cam is rotated into an annular attitude wherein a substantial distance obtains between the pivot pin 56 and the point of tangency between the arcuate cam surface and the underlying surface of the top panel 43 of the carriage.

In moving the lever 54 from base to operative attitude, the eccentric cam 57 progressively bears with great downward force against the underlying carriage, causing the carriage to eject or protrude downwardly, with the entire force being transmitted through the ground engaging wheels to the supporting surface 49. By reactive force acting through the wheel axles 47 to the carriage 41, thence through the cam 57 and the pivot pin 56 to the housing 32 and the box 12, the box and battery are elevated.

In order to equalize the downward urgency of the cam on the carriage, thereby preventing any tendency of the carriage to cock and bind against the encompassing channel walls, there is provided a second eccentric cam 58 pivotally mounted on a second pivot pin 59 spanning the plate 33 and side wall 17. The second cam 58 is angularly inclined identical to the first cam 57 (see FIG. 2) and is secured to a crank arm 61 parallel to the lever 54. A tie-rod 62 is pivotally mounted on the lever 54 and the crank arm 61 by respective pivot pins 64 and 66, the tie-rod assuring smooth simultaneous action of the eccentric cams 57 and 58.

As a further safety feature, the carriage 41 can be selectively locked in fully elevated position by a pawl 71, pivotally mountd on a pin 72 secured to the side wall 17, and a ratchet tooth 73 mounted transversely on the upper arcuate surface of the adjacent cam 57.

In base position, the ratchet tooth 73 is distant from the pawl 71, as appears most clearly in FIG. 1. When, however, the operating lever swings the cam into box-elevating position, the ratchet tooth 73 is angularly swung against the lower tip 74 of the freely movable pawl, displacing the pawl upwardly to allow the tooth to pass. After the ratchet tooth 73 passes slightly beyond the pawl tip 74, the carriage 41 is fully extended and the box is elevated to the appropriate height. At this juncture, the lever 54 is eased back and the pawl tip settles in against the ratchet tooth, thereby locking the box in raised position so that it can readily and conveniently be maneuvered on its wheels.

In order to lower the box, the lever 54 is first slightly pulled outwardly so that the pawl tip 74 is clear of the ratchet tooth 73. Then, while manually swinging and holding the pawl up out of the way of the ratchet tooth, the lever is slowly and firmly returned to base position, allowing the carriage 41 to retract upwardly into the housing while resisting the urgency exerted by the weight of the battery. After the bottom 18 of the battery box has settled down to the floor or other supporting surface, the lever is released.

Despite the relatively large weight involved, the lever length and the eccentric cam shape are such that lifting and lowering is easily effected.

It can therefore be seen that I have provided a battery truck which is not only sturdy and safe in operation but which also enables heavy industrial batteries to be maneuvered with ease.

What is claimed is:

1. A battery truck comprising:
    a. a box including a pair of end walls, a pair of fore and aft side walls, and a bottom capable of supporting a battery;
    b. an elongated, fore and aft housing mounted on each of said side walls, each of said housings including an elongated fore and aft side plate spaced from the adjacent one of said pair of side walls to define therewith an elongated, fore and aft channel;
    c. an elongated, fore and aft carriage vertically movable in each of said channels between a first retracted position and a second projected position, each of said carriages including at least two rollers on said carriage in fore and aft alignment, the bottom of said rollers extending below said housing and said box in said second position of said carriage;
    d. at least two eccentric cams rockably mounted on each of said housings in fore and aft alignment and in operating engagement with the top of the underlying one of said carriages; and,
    e. lever means connecting each of said pair of cams for selectively urging said cams downwardly against said carriage to an extent sufficient to move said carriage from said first position to said second position, thereby elevating said box above a supporting surface by reactive force exerted by said rollers in engagement with the supporting surface upwardly against said carriage, said pair of cams, said housing and said box.

2. A battery truck as in claim 1 including pawl and ratchet means associated with said lever means and said cams for selectively locking said carriage in said second position.

3. A battery truck as in claim 1 further including limit stop means carried on said housing for limiting the extent of downward movement of said carriage relative to said housing.

* * * * *